April 20, 1954 W. R. ISOM 2,676,023
SOUND RECORDING CAMERA
Filed Oct. 29, 1949 3 Sheets-Sheet 1

Inventor
WARREN R. ISOM

By *Val R. Goshow*

ATTORNEY

April 20, 1954 W. R. ISOM 2,676,023
SOUND RECORDING CAMERA
Filed Oct. 29, 1949 3 Sheets-Sheet 2

Inventor
WARREN R. ISOM
By
ATTORNEY

Inventor
WARREN R. ISOM

Patented Apr. 20, 1954

2,676,023

UNITED STATES PATENT OFFICE 2,676,023

SOUND RECORDING CAMERA

Warren R. Isom, West Collingswood, N. J., assignor to Radio Corporation of America, a corporation of Delaware Application October 29, 1949, Serial No. 124,397

2 Claims. (Cl. 274—4)

This invention relates to sound motion picture equipment, and particularly to a camera and combination photographic and magnetic sound recorder for either sixteen or thirty-five millimeter film or for recording either photographic or magnetic sound records without pictures.

Combination camera and sound recorders of the type wherein both the picture and sound are simultaneously photographed and recorded on the same film are known in the art, the present invention being directed to such a single film camera of this general type; but which, in addition, will record a magnetic track on a film on which a magnetic material has been disposed in addition to, or in place of, a photographic track. Because of many advantages of magnetic recording, a picture film having magnetizable record material thereon is now provided, and it is particularly desirable, therefore, that a camera-recorder unit be capable of recording either type of sound track. By placing the magnetic material on the photographic picture negative, or a picture film of the reversal type, good quality sound is obtainable, while the picture film may be subjected to optimum development conditions.

The invention, in brief, therefore, includes a novel film drive, which permits a film to be threaded around a speed control roller in either of two paths. One path advances the film around the roller to provide the film with a constant speed motion, sound modulated light being impressed on the film while on the roller. The other path for the film is around the roller in a different direction, but which provides the same constancy of film motion and permits the film to be advanced past and in contact with a magnetic recording head for applying the sound signals.

The principal object of the invention, therefore, is to facilitate the photographing of pictures and the recording of concomitant sound therefor.

Another object of the invention is to provide an improved combination single film camera for photographic or magnetic records.

A further object of the invention is to provide a single film camera and sound recorder film drive which permit the recording of either a photographic record or a magnetic record on appropriate film.

A still further object of the invention is to provide a film drive having uniform film motion for recording either a photographic or a magnetic record thereon.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
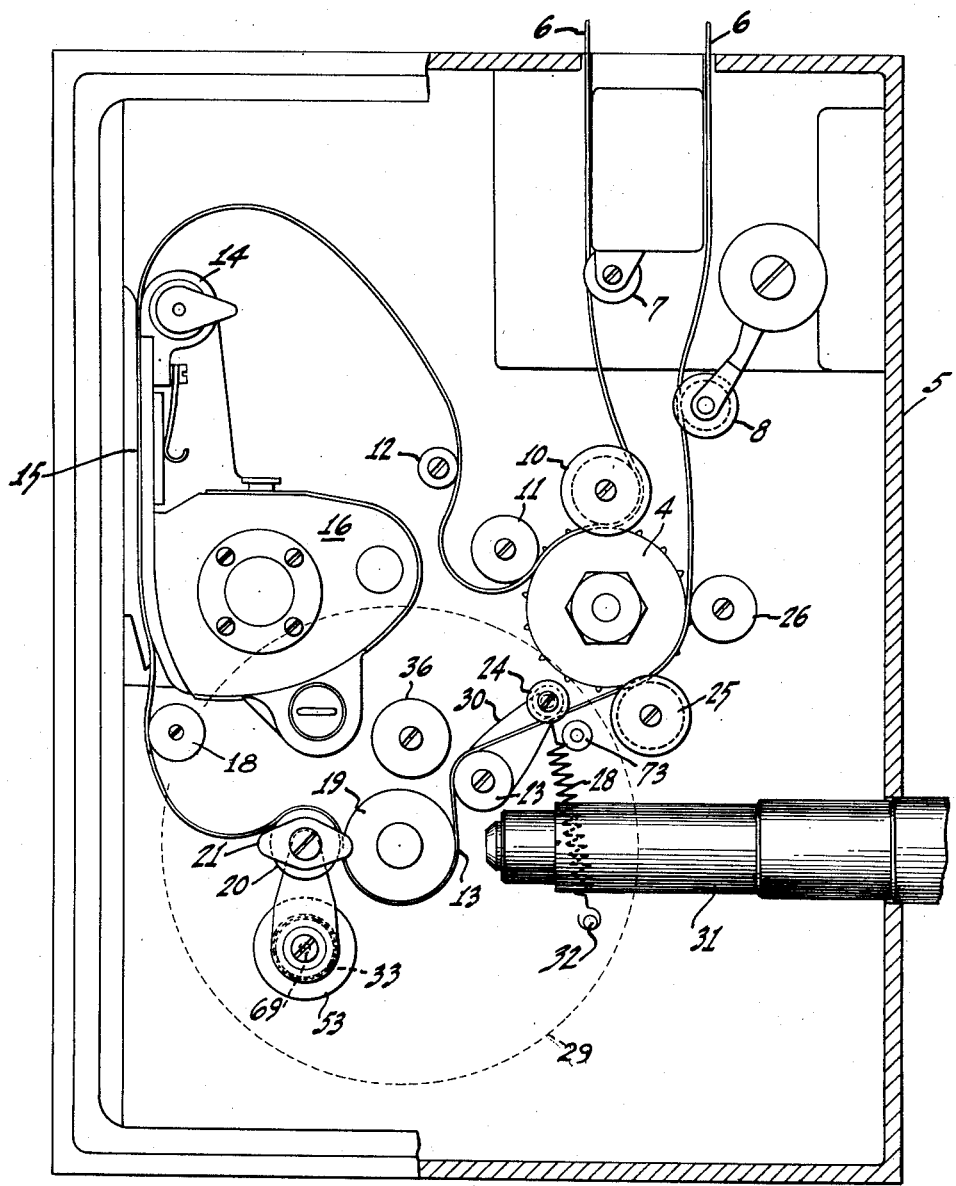
Fig. 1 is an elevational view showing the film path for recording a photographic sound record.

Referring now to the drawings, in which the same numerals identify like elements, a single camera case 5 has a photographic sound record film 6 entering therein past a roller 7 and leaving past a roller 8. The film path from the roller 7 is to a sprocket 4 and under a guide pad roller 10 and a pad roller 11. The film then passes over a guide roller 12 and a picture gate roller 14 to the regular picture taking aperture gate 15, where it is advanced intermittently by an intermittent mechanism housed within a casing 16. The film is then passed into a loop guided by a roller 18 to a film-pulled drum 19, having a pressure roller 20 and an edge guide member 21. From the film-pulled drum 19, the film passes over a fixed roller 23, under a properly damped spring-tensioned filter roller 24 and to the sprocket 4, under guide roller 25 and pad roller 26, and then to the exit roller 8.

Figure 3:
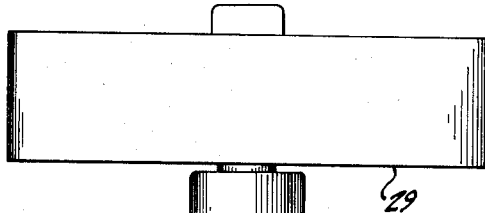
Fig. 3 is a plan view of the film path elements adjacent the recording drum of the invention.
Figure 4:
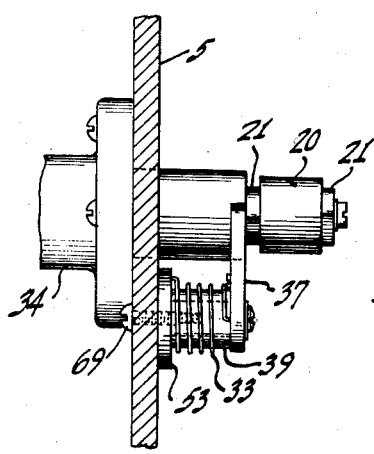
Fig. 4 is a detailed view of the pressure roller construction shown in Fig. 3.

The spring-tensioned filter roller 24 is mounted on an arm 30, pivoted on the shaft axis of roller 23, and tensioned by a spring 28 anchored at 32, while the shaft of the film drum 19 is rotatable in a housing 34 and has a flywheel 29 connected thereto, as shown in Fig. 3, and by the dotted lines in Fig. 1. The pressure roller 20 is mounted on a bracket 37, pivoted on an extension 38, and under tension of a coil spring 33, anchored in a rotatable plate 53, attached to the frame and to the bracket 37, to maintain pressure on the film at the left-hand side of the drum 19. Plate 53 is attached to the frame so that it can be rotated to adjust the spring tension on pressure roller 20. Rotation of plate 53 in a clockwise direction increases the compression in the spring 33, and thus, the pressure of roller 20 on the film. Sound modulated light from a modulator, not shown, is projected through an optical barrel 31 to the film while on the drum 19, at which point, the film has a uniform film motion.

The above threading of the camera-recorder permits pictures to be taken at 15 and sound to be recorded at translation point 13, the film being given uniform speed at this point by drum 19 and spring-tensioned filter roller 24.

Figure 2:
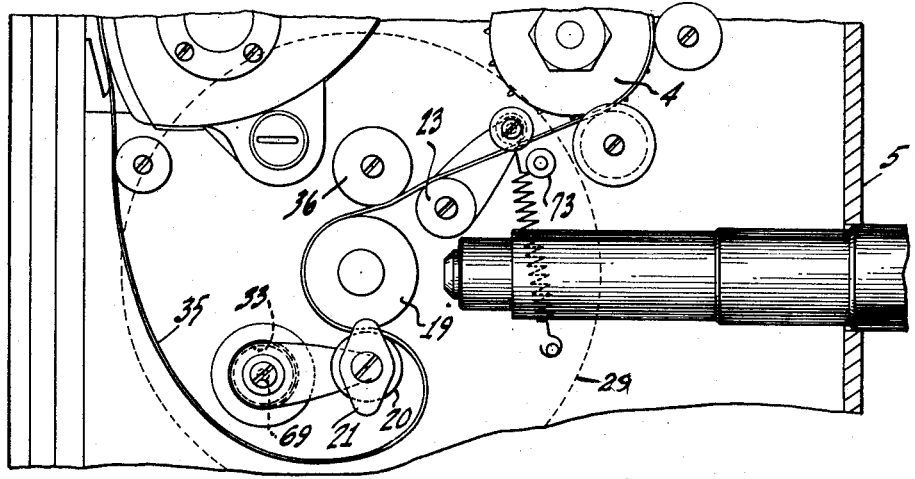
Fig. 2 is an elevational view of the sound recording path of the film for recording a magnetic sound record thereon.

To record sound on magnetizable material which has been applied to a motion picture film, such a film 35 is threaded as shown in Fig. 2, whereby the film now passes around the left-hand side of the drum 19 and is held at the bottom side thereof by the pressure roller 20. To utilize the spring 33 to hold the film on drum 19, the plate 53 is rotated in a counterclockwise direction until the spring 33 is in extension and exerts the desired pressure on the bottom side of the drum. The film has the same path around the sprocket 4 and through the intermittent mechanism 16, but it now is in contact with the gap of a magnetic sound head 36, where the sound is recorded thereon. Since the film is again wrapped around the drum 19 and passes under spring-tensioned filter roller 24, good speed regulation is given the film, since the head 36 is positioned immediately adjacent the drum.

Figure 5:
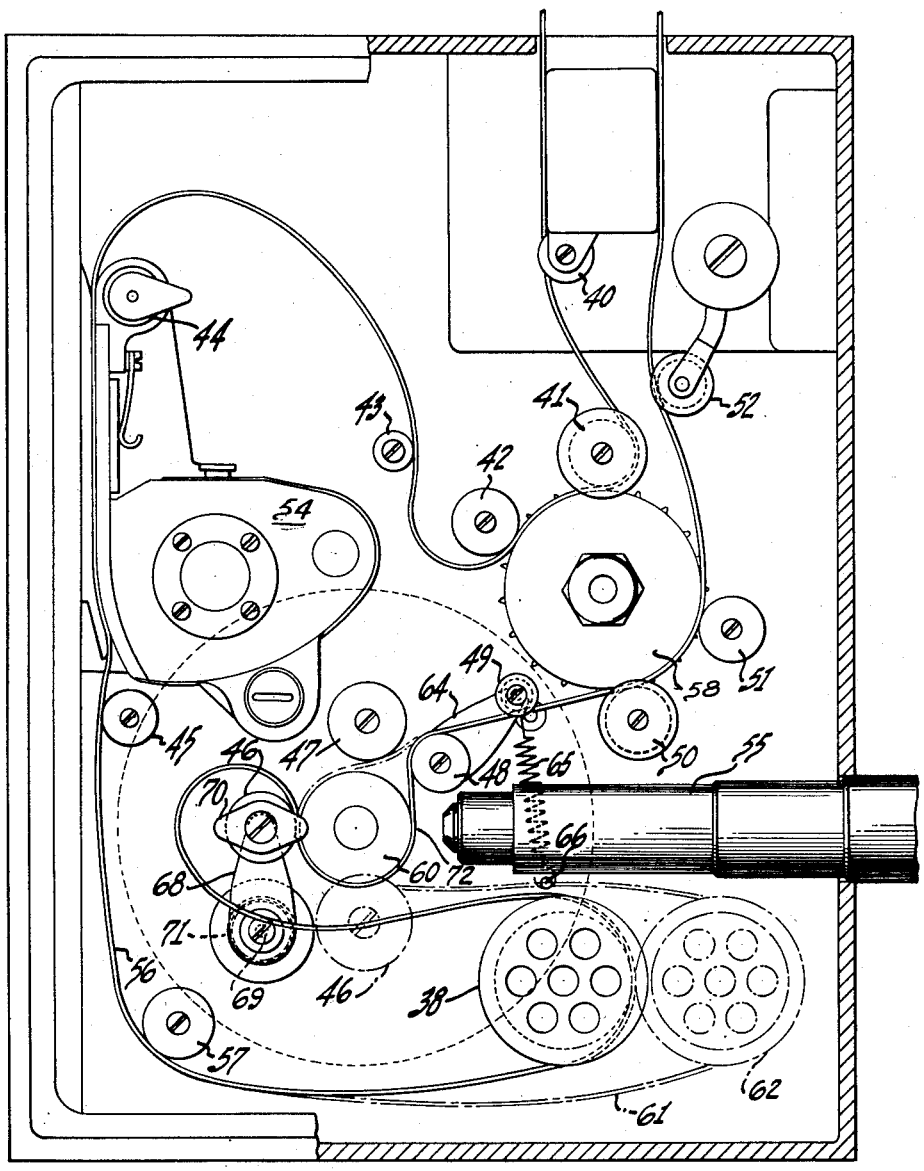
Fig. 5 is a view showing a film drive for recording either a photographic sound record or a magnetic sound record on thirty-five millimeter picture film.

The film path shown in Figs. 1 to 4, inclusive, is thus suitable for sixteen millimeter film having a single row of sprocket holes and either a photographic or a magnetizable sound record material thereon. For thirty-five millimeter picture film with either photographic or magnetizable sound material thereon, the modification shown in Fig. 5 is used. In this instance, a sprocket 38, in the position of sprocket 4 of Figs. 1 to 4, inclusive, is now a thirty-five millimeter film sprocket, and the various rollers 40, 41, 42, 43, 44, 45, 46, 48, 49, 50, 51, and 52 are now of the thirty-five millimeter type, the sprocket 38 having the usual double row of sprocket teeth. The intermittent mechanism in housing 54 is suitable for advancing the thirty-five millimeter film past the picture taking aperture. To provide the proper distance between the picture photographed at the aperture and the sound recorded photographically by a sound light objective tube 55, a photographic film, such as shown in the full lines 56, passes around a roller 57 and a roller 58, over pressure roller 46, around the drum 60, over roller 48, under spring-tensioned filter roller 49, to sprocket 38. The arm 64, carrying the roller 49, is pivoted on the axis of roller 40, and is under tension of spring 65 anchored at 66. The pressure roller 46 is mounted on a bracket 68 similarly to bracket 37 in Fig. 4, so as not to interfere with the passage of film 56. The bracket is pivoted at 69 and carries an edge guide 70. It is under tension of a coil spring 71 in the same manner as in Figs. 1 to 4, inclusive. Thus, the photographic sound track film has pictures photographed thereon at the picture gate and sound recorded thereon at translator point 72.

With the magnetic head located at 47, as in Figs. 1 to 4, inclusive, a film carrying magnetic record material, as shown by the dotted lines 61, is passed around a roller 62, around the left-hand side of drum 60, with the pressure roller 46 now on the lower side of the drum 60, then in contact with head 47, over roller 48, and under spring-tensioned filter roller 49, to sprocket 38. The two rollers 58 and 62 provide the desired film length between the picture gate and the translation point 72, and the magnetic recording point at head 47. Furthermore, as in the sixteen millimeter recorder, uniform film motion is given the magnetic record by the drum 60. Thus, a film path is provided for either sixteen millimeter photographic or magnetic sound track film, and also, for thirty-five millimeter photographic or magnetic sound track film. Although two independent recorders may be provided, a single unit could be used for both films by changing the drums, rollers, sprockets, and intermittent mechanisms for the respective sized films. In every instance, however, the same uniform film motion and high quality recording is obtainable. Since sound is recorded photographically on the same side of the film as the picture is photographed, this side of the film is toward the light at translation points 13 and 72. However, since the magnetic material is on the base or opposite side of the film, the heads 36 and 47 contact this side of the film. The apparatus may also be used as sound recorders only for either photographic or magnetic films, in which case the intermittent mechanisms may be readily removed, if desired.

I claim:

1. In a camera recorder for recording both magnetic and photographic sound tracks in a film having a photographic emulsion on one side thereof and a magnetic sound track medium on the other side thereof, the combination of a casing; a film pulled drum mounted in said casing; a sound light objective tube and a magnetic sound head mounted in said casing and disposed around said drum in spaced relationship from each other and from said drum; a pressure roller; the said roller being mounted on the end of a spring biased bracket pivoted at its other end to said casing at a point laterally spaced from said drum, whereby when said film is threaded over and partially around said drum with the magnetic medium in contact with said head, the said roller may be swung against the film to hold the same on the drum for magnetic recording and whereby when the film is threaded around the drum between the said tube and drum and out of contact with said head, the said roller may be swung against that portion of the film contacting that side of the drum opposite said tube for holding the film on the drum for sound light recording.

2. An advancing mechanism for a photographic picture film provided with a photographic emulsion on one side thereof and a magnetic sound track medium on the other side thereof, comprising a casing, a sprocket mounted in said casing, an inertia sound drum mounted in said casing for stabilizing the motion of said film, means whereby said film may be threaded over said drum in two positions, the emulsion side of said film being in contact with said drum in one position and the magnetic sound track medium side of said film being in contact with the opposite side of said drum in the other position; a magnetic sound head and a sound light tube; means mounting said head in said casing in a position to bear against the film when its emulsion side is in contact with said drum and mounting the said tube in spaced relation to said head and drum whereby light therefrom may be impressed on the film when its magnetic sound track medium is in contact with said drum; a pressure roller for holding said film on said drum and movable to two positions, said roller bearing against and holding said film on said drum at a point at which said film first contacts the surface of said drum when one side of said film is in contact with said drum for impressing light on the emulsion on the opposite side of said film and bearing against and holding said film on said drum at the point at which said film first contacts the surface of said drum when the other side of said film is in contact with said drum for impressing a signal on said magnetic sound track medium on the opposite side of said film, and resilient means for urging said roller toward said drum.

References Cited in the file of this patent

UNITED STATES PATENTS

| Number | Name | Date |
|---|---|---|
| 1,920,789 | Heisler | Aug. 1, 1933 |
| 2,154,589 | Vermeulen et al. | Apr. 18, 1939 |
| 2,242,574 | Eggert | May 20, 1941 |
| 2,273,024 | De Vry et al. | Feb. 17, 1942 |
| 2,419,682 | Guillemin | Apr. 29, 1947 |
| 2,479,868 | Rossman | Aug. 23, 1949 |
| 2,479,869 | Rossman | Aug. 23, 1949 |
| 2,480,162 | Rath | Aug. 30, 1949 |
| 2,485,839 | O'Dea | Oct. 25, 1949 |
| 2,585,913 | Camras | Feb. 19, 1952 |